(12) United States Patent
Richardson et al.

(10) Patent No.: US 8,930,513 B1
(45) Date of Patent: *Jan. 6, 2015

(54) LATENCY MEASUREMENT IN RESOURCE REQUESTS

(75) Inventors: David R. Richardson, Seattle, WA (US); John Cormie, Seattle, WA (US); Colm MacCarthaigh, Seattle, WA (US); Benjamin W. S. Redman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/892,861

(22) Filed: Sep. 28, 2010

(51) Int. Cl.
*G06F 15/173* (2006.01)

(52) U.S. Cl.
USPC .................. 709/223; 709/217; 709/238

(58) Field of Classification Search
USPC ......... 709/201, 203, 223, 217, 219, 220, 221, 709/238
See application file for complete search history.

(56) References Cited

U.S. PATENT DOCUMENTS

| | | |
|---|---|---|
| 5,341,477 A | 8/1994 | Pitkin et al. |
| 5,611,049 A | 3/1997 | Pitts |
| 5,774,660 A * | 6/1998 | Brendel et al. ............. 709/201 |
| 5,852,717 A | 12/1998 | Bhide et al. |
| 5,892,914 A | 4/1999 | Pitts |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,078,960 A | 6/2000 | Ballard |
| 6,085,234 A | 7/2000 | Pitts et al. |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |
| 6,182,111 B1 | 1/2001 | Inohara et al. |
| 6,185,598 B1 | 2/2001 | Farber et al. |

(Continued)

FOREIGN PATENT DOCUMENTS

| | | |
|---|---|---|
| CN | 1422468 A | 6/2003 |
| CN | 1605182 A | 4/2005 |

(Continued)

OTHER PUBLICATIONS

International Search Report and Written Opinion in PCT/US2011/053302 mailed Nov. 28, 2011 in 11 pages.

(Continued)

*Primary Examiner* — Jimmy H Tran
(74) *Attorney, Agent, or Firm* — Knobbe, Martens, Olson & Bear, LLP

(57) ABSTRACT

Systems and method for the management and processing of resource requests by a service provider, such as a content delivery network ("CDN") service provider, on behalf of a content provider are provided. The CDN service provider can measure the performance associated with the delivery of resources to requesting client computing devices from various computing devices associated with the CDN service provider. In one embodiment, the CDN service provider can utilize commands responsive to an initial request for a resource that causes the requesting client computing device to transmit one or more supplemental resource requests. Information associated with the processing of the sequence of resource requests can be used to measure CDN service provider latencies.

15 Claims, 14 Drawing Sheets

(56) References Cited

U.S. PATENT DOCUMENTS

| | | | |
|---|---|---|---|
| 6,192,051 | B1 | 2/2001 | Lipman et al. |
| 6,205,475 | B1 | 3/2001 | Pitts |
| 6,223,288 | B1 | 4/2001 | Angles et al. |
| 6,275,496 | B1 | 8/2001 | Burns et al. |
| 6,286,043 | B1 | 9/2001 | Cuomo et al. |
| 6,286,084 | B1 | 9/2001 | Wexler et al. |
| 6,304,913 | B1 | 10/2001 | Rune |
| 6,351,743 | B1 | 2/2002 | DeArdo et al. |
| 6,351,775 | B1 | 2/2002 | Yu |
| 6,363,411 | B1 | 3/2002 | Dugan et al. |
| 6,366,952 | B2 | 4/2002 | Pitts |
| 6,374,290 | B1 | 4/2002 | Scharber et al. |
| 6,405,252 | B1 | 6/2002 | Gupta et al. |
| 6,411,967 | B1 | 6/2002 | Van Renesse |
| 6,415,280 | B1 | 7/2002 | Farber et al. |
| 6,430,607 | B1 | 8/2002 | Kavner |
| 6,438,592 | B1 | 8/2002 | Killian |
| 6,452,925 | B1 | 9/2002 | Sistanizadeh et al. |
| 6,457,047 | B1 | 9/2002 | Chandra et al. |
| 6,459,909 | B1 | 10/2002 | Bilcliff et al. |
| 6,473,804 | B1 | 10/2002 | Kaiser et al. |
| 6,484,143 | B1 | 11/2002 | Swildens et al. |
| 6,505,241 | B2 | 1/2003 | Pitts |
| 6,529,953 | B1 | 3/2003 | Van Renesse |
| 6,553,413 | B1 | 4/2003 | Lewin et al. |
| 6,560,610 | B1 | 5/2003 | Eatherton et al. |
| 6,611,873 | B1 | 8/2003 | Kanehara |
| 6,654,807 | B2 | 11/2003 | Farber et al. |
| 6,658,462 | B1 | 12/2003 | Dutta |
| 6,665,706 | B2 | 12/2003 | Kenner et al. |
| 6,678,791 | B1 | 1/2004 | Jacobs et al. |
| 6,694,358 | B1 * | 2/2004 | Swildens et al. ............... 709/218 |
| 6,697,805 | B1 | 2/2004 | Choquier et al. |
| 6,724,770 | B1 | 4/2004 | Van Renesse |
| 6,732,237 | B1 | 5/2004 | Jacobs et al. |
| 6,754,699 | B2 | 6/2004 | Swildens et al. |
| 6,754,706 | B1 | 6/2004 | Swildens et al. |
| 6,760,721 | B1 | 7/2004 | Chasen et al. |
| 6,769,031 | B1 | 7/2004 | Bero |
| 6,782,398 | B1 | 8/2004 | Bahl |
| 6,785,704 | B1 | 8/2004 | McCanne |
| 6,804,706 | B2 | 10/2004 | Pitts |
| 6,810,291 | B2 | 10/2004 | Card et al. |
| 6,810,411 | B1 | 10/2004 | Coughlin et al. |
| 6,829,654 | B1 | 12/2004 | Jungck |
| 6,874,017 | B1 | 3/2005 | Inoue et al. |
| 6,928,467 | B2 | 8/2005 | Peng |
| 6,941,562 | B2 | 9/2005 | Gao et al. |
| 6,963,850 | B1 | 11/2005 | Bezos et al. |
| 6,981,017 | B1 | 12/2005 | Kasriel et al. |
| 6,986,018 | B2 | 1/2006 | O'Rourke et al. |
| 6,990,526 | B1 | 1/2006 | Zhu |
| 6,996,616 | B1 | 2/2006 | Leighton et al. |
| 7,003,555 | B1 | 2/2006 | Jungck |
| 7,006,099 | B2 | 2/2006 | Gut et al. |
| 7,007,089 | B2 | 2/2006 | Freedman |
| 7,010,578 | B1 | 3/2006 | Lewin et al. |
| 7,010,598 | B2 | 3/2006 | Sitaraman et al. |
| 7,024,466 | B2 | 4/2006 | Outten et al. |
| 7,032,010 | B1 | 4/2006 | Swildens et al. |
| 7,058,706 | B1 * | 6/2006 | Iyer et al. ..................... 709/223 |
| 7,058,953 | B2 | 6/2006 | Willard et al. |
| 7,065,587 | B2 | 6/2006 | Huitema et al. |
| 7,072,982 | B2 | 7/2006 | Teodosiu et al. |
| 7,076,633 | B2 | 7/2006 | Tormasov et al. |
| 7,082,476 | B1 | 7/2006 | Cohen et al. |
| 7,086,061 | B1 | 8/2006 | Joshi et al. |
| 7,092,505 | B2 | 8/2006 | Allison et al. |
| 7,092,997 | B1 | 8/2006 | Kasriel et al. |
| 7,099,936 | B2 | 8/2006 | Chase et al. |
| 7,103,645 | B2 | 9/2006 | Leighton et al. |
| 7,117,262 | B2 | 10/2006 | Bai et al. |
| 7,133,905 | B2 | 11/2006 | Dilley et al. |
| 7,136,922 | B2 | 11/2006 | Sundaram et al. |
| 7,139,821 | B1 | 11/2006 | Shah et al. |
| 7,143,169 | B1 | 11/2006 | Champagne et al. |
| 7,146,560 | B2 | 12/2006 | Dang et al. |
| 7,149,809 | B2 | 12/2006 | Barde et al. |
| 7,152,118 | B2 | 12/2006 | Anderson, IV et al. |
| 7,174,382 | B2 | 2/2007 | Ramanathan et al. |
| 7,185,063 | B1 | 2/2007 | Kasriel et al. |
| 7,188,214 | B1 | 3/2007 | Kasriel et al. |
| 7,194,522 | B1 * | 3/2007 | Swildens et al. ............... 709/217 |
| 7,200,667 | B2 | 4/2007 | Teodosiu et al. |
| 7,216,170 | B2 | 5/2007 | Danker et al. |
| 7,225,254 | B1 | 5/2007 | Swildens et al. |
| 7,228,350 | B2 | 6/2007 | Hong et al. |
| 7,228,359 | B1 | 6/2007 | Monteiro |
| 7,233,978 | B2 | 6/2007 | Overton et al. |
| 7,240,100 | B1 | 7/2007 | Wein et al. |
| 7,254,636 | B1 | 8/2007 | O'Toole, Jr. et al. |
| 7,257,581 | B1 | 8/2007 | Steele et al. |
| 7,260,598 | B1 | 8/2007 | Liskov et al. |
| 7,269,784 | B1 | 9/2007 | Kasriel et al. |
| 7,274,658 | B2 | 9/2007 | Bornstein et al. |
| 7,289,519 | B1 | 10/2007 | Liskov |
| 7,293,093 | B2 | 11/2007 | Leighton |
| 7,310,686 | B2 | 12/2007 | Uysal |
| 7,316,648 | B2 | 1/2008 | Kelly et al. |
| 7,320,131 | B1 | 1/2008 | O'Toole, Jr. |
| 7,321,918 | B2 | 1/2008 | Burd et al. |
| 7,363,291 | B1 | 4/2008 | Page |
| 7,373,416 | B2 | 5/2008 | Kagan et al. |
| 7,376,736 | B2 | 5/2008 | Sundaram et al. |
| 7,380,078 | B2 | 5/2008 | Ikegaya et al. |
| 7,398,301 | B2 | 7/2008 | Hennessey et al. |
| 7,430,610 | B2 | 9/2008 | Pace et al. |
| 7,441,045 | B2 | 10/2008 | Skene et al. |
| 7,454,500 | B1 | 11/2008 | Hsu et al. |
| 7,461,170 | B1 | 12/2008 | Taylor et al. |
| 7,464,142 | B2 | 12/2008 | Flurry et al. |
| 7,478,148 | B2 | 1/2009 | Neerdaels |
| 7,492,720 | B2 | 2/2009 | Pruthi et al. |
| 7,499,998 | B2 | 3/2009 | Toebes et al. |
| 7,502,836 | B1 | 3/2009 | Menditto et al. |
| 7,519,720 | B2 | 4/2009 | Fishman et al. |
| 7,543,024 | B2 | 6/2009 | Holstege |
| 7,548,947 | B2 | 6/2009 | Kasriel et al. |
| 7,552,235 | B2 | 6/2009 | Chase et al. |
| 7,565,407 | B1 | 7/2009 | Hayball |
| 7,573,916 | B1 | 8/2009 | Bechtolsheim et al. |
| 7,594,189 | B1 | 9/2009 | Walker et al. |
| 7,596,619 | B2 | 9/2009 | Leighton et al. |
| 7,623,460 | B2 | 11/2009 | Miyazaki |
| 7,624,169 | B2 | 11/2009 | Lisiecki et al. |
| 7,640,296 | B2 | 12/2009 | Fuchs et al. |
| 7,650,376 | B1 | 1/2010 | Blumenau |
| 7,653,700 | B1 | 1/2010 | Bahl et al. |
| 7,653,725 | B2 | 1/2010 | Yahiro et al. |
| 7,657,622 | B1 | 2/2010 | Douglis et al. |
| 7,680,897 | B1 | 3/2010 | Carter et al. |
| 7,702,724 | B1 | 4/2010 | Brydon et al. |
| 7,706,740 | B2 | 4/2010 | Collins et al. |
| 7,707,314 | B2 | 4/2010 | McCarthy et al. |
| 7,711,647 | B2 | 5/2010 | Gunaseelan et al. |
| 7,711,788 | B2 | 5/2010 | Lev Ran et al. |
| 7,716,367 | B1 | 5/2010 | Leighton et al. |
| 7,725,602 | B2 * | 5/2010 | Liu et al. ....................... 709/245 |
| 7,730,187 | B2 | 6/2010 | Raciborski et al. |
| 7,739,400 | B2 | 6/2010 | Lindbo et al. |
| 7,747,720 | B2 | 6/2010 | Toebes et al. |
| 7,756,913 | B1 | 7/2010 | Day |
| 7,761,572 | B1 | 7/2010 | Auerbach |
| 7,765,304 | B2 | 7/2010 | Davis et al. |
| 7,769,823 | B2 | 8/2010 | Jenny et al. |
| 7,773,596 | B1 | 8/2010 | Marques |
| 7,774,342 | B1 | 8/2010 | Virdy |
| 7,787,380 | B1 | 8/2010 | Aggarwal et al. |
| 7,792,989 | B2 | 9/2010 | Toebes et al. |
| 7,809,597 | B2 | 10/2010 | Das et al. |
| 7,813,308 | B2 | 10/2010 | Reddy et al. |
| 7,814,229 | B1 | 10/2010 | Cabrera et al. |
| 7,818,454 | B2 | 10/2010 | Kim et al. |
| 7,836,177 | B2 | 11/2010 | Kasriel et al. |

(56) References Cited

U.S. PATENT DOCUMENTS

| | | |
|---|---|---|
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,156,243 B2 | 4/2012 | Richardson et al. |
| 8,190,682 B2 | 5/2012 | Paterson-Jones et al. |
| 8,224,986 B1 | 7/2012 | Liskov et al. |
| 8,234,403 B2 | 7/2012 | Richardson et al. |
| 8,239,530 B2 | 8/2012 | Sundaram et al. |
| 8,250,211 B2 | 8/2012 | Swildens et al. |
| 8,266,288 B2 | 9/2012 | Banerjee et al. |
| 8,266,327 B2 | 9/2012 | Kumar et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 8,452,874 B2 | 5/2013 | MacCarthaigh et al. |
| 8,468,222 B2 | 6/2013 | Sakata et al. |
| 8,521,851 B1* | 8/2013 | Richardson et al. .......... 709/220 |
| 8,521,908 B2 | 8/2013 | Holmes et al. |
| 8,527,658 B2 | 9/2013 | Holmes et al. |
| 8,577,992 B1 | 11/2013 | Richardson et al. |
| 8,615,549 B2 | 12/2013 | Knowles et al. |
| 8,626,950 B1 | 1/2014 | Richardson et al. |
| 8,639,817 B2 | 1/2014 | Sivasubramanian et al. |
| 8,676,918 B2 | 3/2014 | Richardson et al. |
| 8,688,837 B1 | 4/2014 | Richardson et al. |
| 8,732,309 B1 | 5/2014 | Richardson et al. |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1* | 5/2002 | Swildens et al. ............. 709/223 |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1* | 8/2003 | Chaudhri et al. ................. 705/1 |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233455 A1 | 12/2003 | Leber et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |

(56) References Cited

U.S. PATENT DOCUMENTS

| | | |
|---|---|---|
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0047813 A1* | 3/2006 | Aggarwal et al. ............. 709/226 |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0112066 A1 | 5/2006 | Hamzy |
| 2006/0112176 A1* | 5/2006 | Liu et al. ...................... 709/223 |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1* | 11/2006 | Chang et al. ................... 709/217 |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0038994 A1* | 2/2007 | Davis et al. ................... 717/174 |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1* | 7/2007 | Swildens et al. ............. 709/217 |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271375 A1 | 11/2007 | Hwang |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |

(56) References Cited

U.S. PATENT DOCUMENTS

| | | |
|---|---|---|
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1* | 5/2009 | Swildens et al. ............... 709/203 |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | Dacosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0034470 A1 | 2/2010 | Valencia-Campo et al. |
| 2010/0036944 A1 | 2/2010 | Douglis et al. |
| 2010/0057894 A1 | 3/2010 | Glasser |
| 2010/0070603 A1 | 3/2010 | Moss et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0293479 A1 | 11/2010 | Rousso et al. |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0078000 A1 | 3/2011 | Ma et al. |
| 2011/0078230 A1* | 3/2011 | Sepulveda ............... 709/203 |
| 2011/0087769 A1 | 4/2011 | Holmes et al. |
| 2011/0096987 A1 | 4/2011 | Morales et al. |
| 2011/0153941 A1 | 6/2011 | Spatscheck et al. |
| 2011/0191449 A1 | 8/2011 | Swildens et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1* | 11/2011 | Girbal ............... 709/203 |
| 2012/0036238 A1 | 2/2012 | Sundaram et al. |
| 2012/0066360 A1 | 3/2012 | Ghosh |
| 2012/0124184 A1 | 5/2012 | Sakata et al. |
| 2012/0131177 A1 | 5/2012 | Brandt et al. |
| 2012/0166516 A1 | 6/2012 | Simmons et al. |
| 2012/0169646 A1 | 7/2012 | Berkes et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303804 A1 | 11/2012 | Sundaram et al. |
| 2012/0311648 A1 | 12/2012 | Swildens et al. |
| 2013/0041872 A1 | 2/2013 | Aizman et al. |
| 2013/0086001 A1 | 4/2013 | Bhogal et al. |
| 2013/0130221 A1 | 5/2013 | Kortemeyer et al. |
| 2013/0198341 A1 | 8/2013 | Kim |
| 2013/0212300 A1 | 8/2013 | Eggleston et al. |
| 2013/0246567 A1 | 9/2013 | Green et al. |
| 2013/0268616 A1 | 10/2013 | Sakata et al. |
| 2013/0339429 A1 | 12/2013 | Richardson et al. |
| 2014/0075109 A1 | 3/2014 | Richardson et al. |
| 2014/0143320 A1 | 5/2014 | Sivasubramanian et al. |

FOREIGN PATENT DOCUMENTS

| | | |
|---|---|---|
| CN | 101189598 A | 5/2008 |
| CN | 101460907 A | 6/2009 |
| EP | 2008167 | 12/2008 |
| JP | 2001-0506093 | 5/2001 |
| JP | 2002-044137 | 2/2002 |
| JP | 2003-167810 A | 6/2003 |
| JP | 2003-167813 A | 6/2003 |
| JP | 2003522358 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-209623 | 10/2012 |

(56) References Cited

FOREIGN PATENT DOCUMENTS

| WO | WO 2007/007960 A1 | 1/2007 |
|---|---|---|
| WO | WO 2007/126837 A3 | 11/2007 |
| WO | WO 2010/002603 A1 | 1/2010 |
| WO | WO 2012/044587 A1 | 4/2012 |

OTHER PUBLICATIONS

Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
International Search Report and Written Opinion in PCT/US2011/061486 mailed Mar. 30, 2012 in 11 pages.
Baglioni et al., "Preprocessing and Mining Web Log Data for Web Personalization", LNAI 2829, 2003, pp. 237-249.
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Singapore Examination Report in Application No. 201006837-7 mailed May 16, 2012.
First Office Action in Chinese Application No. 200980119993.1 dated Jul. 4, 2012.
First Office Action in Chinese Application No. 200980119995.0 dated Jul. 6, 2012.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bennami, M., et al., Resource Allocation for Autonomic Data Centers Using Analytic Performance Models, 2005, IEEE, 12 pages.
Chipara et al, "Realtime Power-Aware Routing in Sensor Network", IEEE, 2006, 10 pages.
International Preliminary Report on Patentability and Written Opinion in PCT/US2010/060567 mailed on Jun. 19, 2012.
International Preliminary Report on Patentability and Written Opinion in PCT/US2010/060569 mailed Jun. 19, 2012.
International Preliminary Report on Patentability and Written Opinion in PCT/US2010/060573 mailed Jun. 19, 2012.
International Preliminary Report on Patentability in PCT/US2011/053302 mailed Apr. 2, 2013.
International Preliminary Report on Patentability in PCT/US2011/061486 mailed May 22, 2013.
Kounev, S., et al., Autonomic QoS-Aware Resource Management in Grid Computing Using Online Performance Models, 2007, ICST, Valuetools, 2007, 10 pages.
Office Action in Canadian Application No. 2726915 dated May 13, 2013.
Office Action in Chinese Application No. 200780020255.2 dated Mar. 4, 2013.
Office Action in Chinese Application No. 200980119995.0 dated Apr. 15, 2013.
Office Action in Japanese Application No. 2011-516466 mailed Mar. 6, 2013.
Second Office Action in Chinese Application No. 200980119993.1 dated Mar. 12, 2013.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Office Action in Canadian Application No. 2741895 dated Feb. 25, 2013.
Office Action in Korean Application No. 10-2011-7002461 mailed May 29, 2013.
Preliminary Examination in Chinese Application No. 201180053405.6 dated May 28, 2013. English translation not yet received.
Examination Report in Singapore Application No. 201103333-9 dated Aug. 13, 2013.
Office Action in Chinese Application No. 200980119993.1 dated Oct. 21, 2013.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.

(56) References Cited

OTHER PUBLICATIONS

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
First Office Action in Chinese Application No. 200980111426.1 mailed Feb. 16, 2013.
First Office Action in Chinese Application No. 200980145872.4 dated Nov. 29, 2012.
Gruener, J., "A Vision of Togetherness," May 24, 2004, NetworkWorld, retrieved May 3, 2006, from, http://www.networkworld.com/supp/2004/ndc3/0524virt.html, 9 pages.
International Preliminary Report on Patentability in PCT/US2007/007601 mailed Sep. 30, 2008 in 8 pages.
International Search Report and Written Opinion in PCT/US07/07601 mailed Jul. 18, 2008 in 11 pages.
International Search Report and Written Opinion in PCT/US2010/060567 mailed on Mar. 28, 2012.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Candian Application No. 2741895 dated Feb. 25, 2013.
Office Action in Japanese Application No. 2011-502138 mailed Feb. 1, 2013.
Office Action in Japanese Application No. 2011-502140 mailed Dec. 7, 2012.
Office Action in Japanese Application No. 2012-052264 mailed Dec. 11, 2012 in 26 pages.
Search Report and Written Opinion in Singapore Application No. 201103333-9 mailed Nov. 19, 2012.
Shankland, S., "Sun to buy start-up to bolster N1," Jul. 30, 2003, CNet News.com, retrieved May 3, 2006, http://news.zdnet.com/2100-3513_22-5057752.html, 8 pages.
Singapore Written Opinion in Application No. 201006836-9, mailed Apr. 30, 2012 in 10 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09728756.9 mailed Jan. 8, 2013.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
First Office Action in Chinese Application No. 200980111422.3 dated Apr. 13, 2012.
Second Office Action in Chinese Application No. 200980111426.1 mailed Dec. 25, 2013.
First Office Action in Japanese Application No. 2011-502139 dated Nov. 5, 2013.
Third Office Action in Chinese Application No. 200980119993.1 dated Oct. 21, 2013.
Preliminary Examination in Chinese Application No. 201310717573.1 dated Feb. 25, 2014. English Translation Not Yet Received.
First Office Action in Japanese Application No. 2013-529454 mailed Feb. 3, 2014 in 6 pages.
First Office Action issued in Australian Application No. 2011307319 mailed Mar. 6, 2014 in 5 pages.
Office Action in Indian Application No. 3742/KOLNP/2008 dated Nov. 22, 2013.
Third Office Action in Chinese Application No. 200980111426.1 mailed Jul. 7, 2014.
Search Report and Written Opinion in Singapore Application No. 201301573-0 mailed Jul. 1, 2014.
Gunther et al, "Measuring Round Trip Times to determine the Distance between WLAN Nodes", Dec. 18, 2004, Technical University Berlin, all pages.
Examination Report in Singapore Application No. 201006874-0 dated May 16, 2012.
Second Office Action in Japanese Application No. 2011-516466 mailed Mar. 17, 2014.
Office Action in Japanese Application No. 2013-540982 dated Jun. 2, 2014. English Translation Not Yet Received.
Written Opinion in Singapore Application No. 201303521-7 dated May 20, 2014.
Office Action in Japanese Application No. 2013-123086 mailed Apr. 15, 2014 in 3 pages.
Decision of Rejection in Application No. 2011-502139 dated Jun. 30, 2014.
First Office Action in Japanese Application No. 2011-503091 dated Nov. 18, 2013.
Search Report and Written Opinion issued in Singapore Application No. 201006873-2 mailed on Oct. 12, 2011.

\* cited by examiner

LATENCY MEASUREMENT IN RESOURCE REQUESTS

BACKGROUND

Generally described, computing devices and communication networks can be utilized to exchange information. In a common application, a computing device can request content from another computing device via a communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices, often with consideration of efficient transmission of the requested content to the client computing device and/or consideration of a cost associated with the transmission of the content. For larger scale implementations, a content provider may receive content requests from a high volume of client computing devices, which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the embedded resource identifiers reference computing devices associated with the content provider such that the client computing devices would transmit requests for resources to the referenced content provider computing devices.

Some content providers attempt to facilitate the delivery of requested content, such as Web pages and/or resources identified in Web pages, through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

CDN service providers are also generally motivated to provide requested content to client computing devices often with consideration of efficient transmission of the requested content to the client computing device or consideration of a cost associated with the transmission of the content. Typically, CDN service providers often consider factors such as latency of delivery of requested content in order to meet service level agreements or generally improve the quality of delivery service. In turn, the CDN service provider can utilize the considered factors in processing resource requests.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to managing resource requests for one or more resources associated with a content provider. Specifically, aspects of the disclosure will be described with regard to the management and processing a resource requests by a service provider, such as a content delivery network ("CDN") service provider, on behalf of a content provider. Illustratively, the CDN service provider can measure the performance associated with the delivery of resources to requesting client computing devices from various computing devices associated with the CDN service provider. In one embodiment, client computing devices can be provided executable code, such as scripts, that cause the client computing devices to transmit requests to different computing devices associated with the CDN service provider's domain. Information associated with the processing of the responses can be used to measure CDN service provider latencies. In another embodiment, the CDN service provider can utilize commands responsive to an initial request for a resource that causes the requesting client computing device to transmit one or more supplemental resource requests to computing devices associated with the CDN service provider's domain. Information associated with the processing of the sequence of resource requests can be used to measure CDN service provider latencies. In a further embodiment, the CDN service provider can utilize commands corresponding to communication protocols that cause the requesting client computing device to transmit or receive protocol information from multiple computing devices associated with the CDN service provider's domain. Information associated with the processing of the protocol responses can be used to measure CDN service provider latencies Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, application hosting, or other services. However, one skilled in the relevant art will appreciate that a service provider need not provide all, or any, of the additional services or functionality that may be associated with some service providers, such as a CDN service provider. Additionally, although various embodiments will be described with regard to the measurement of performance or latencies associated with the processing of resource requests, one skilled in the relevant art will further appreciate that the various embodiments may be practiced independently or combined in various manners.

Figure 1:
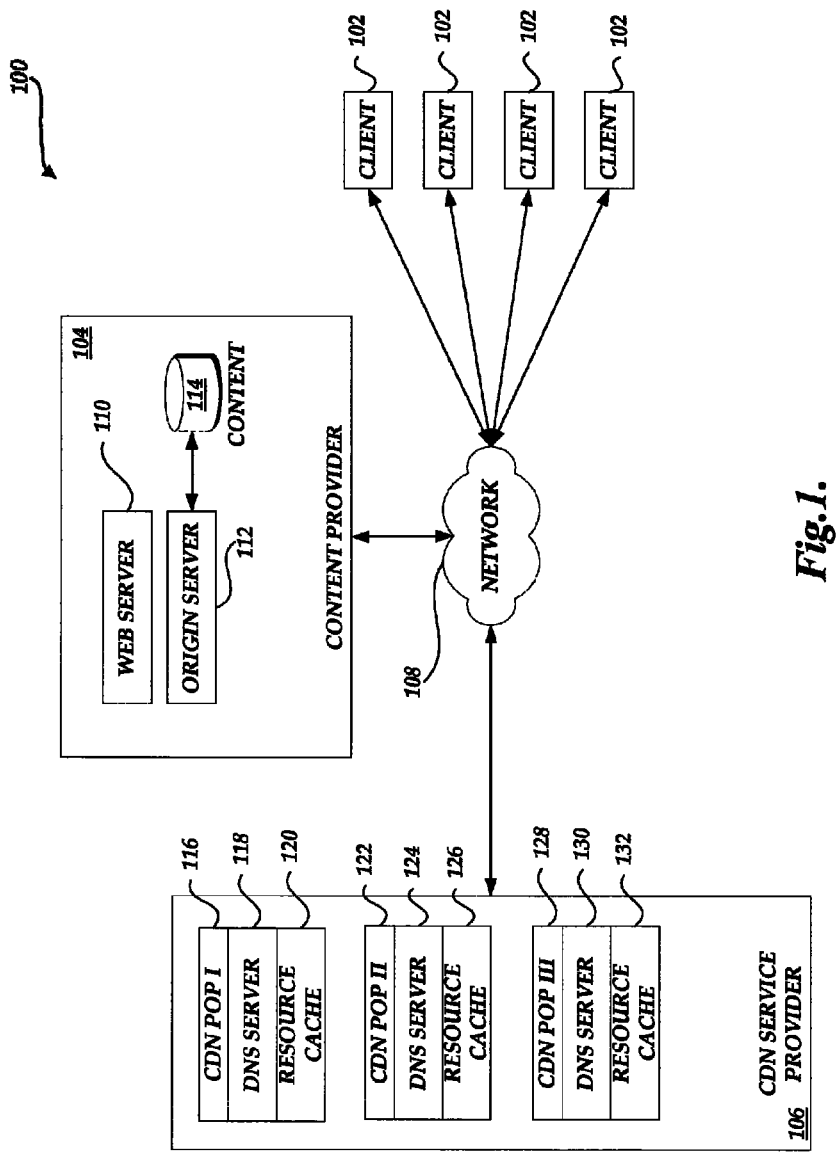
FIG. 1 is a block diagram illustrative of a content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices, including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 can utilize some type of local DNS resolver component, such as a DNS Name server, that generates the DNS queries attributed to the client computing device 102. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102. However, for purposes of the present disclosure, communications facilitated through a network component, such as a DNS Resolver component, will be illustrated as transmitted directly from the client computing devices 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence (herein "POP") locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The DNS components 118, 124, 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

Figure 2:
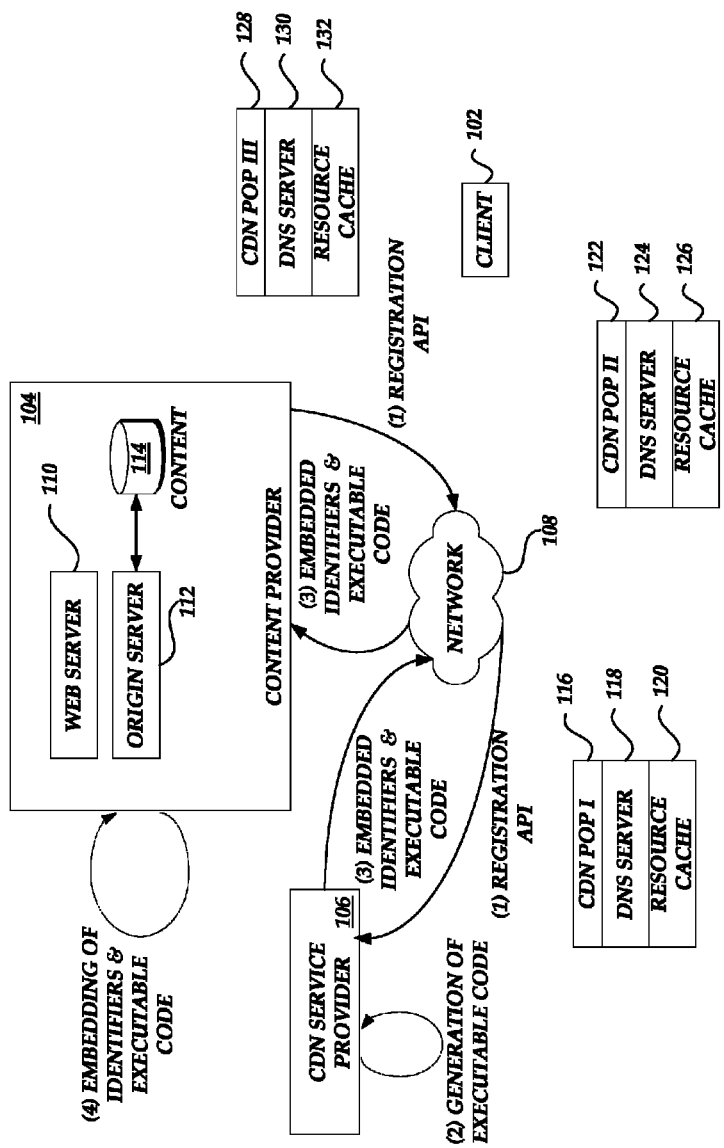
FIG. 2 is a block diagram of the content delivery environment of FIG. 1 illustrating the registration of a content provider with a CDN service provider.
Figure 3:
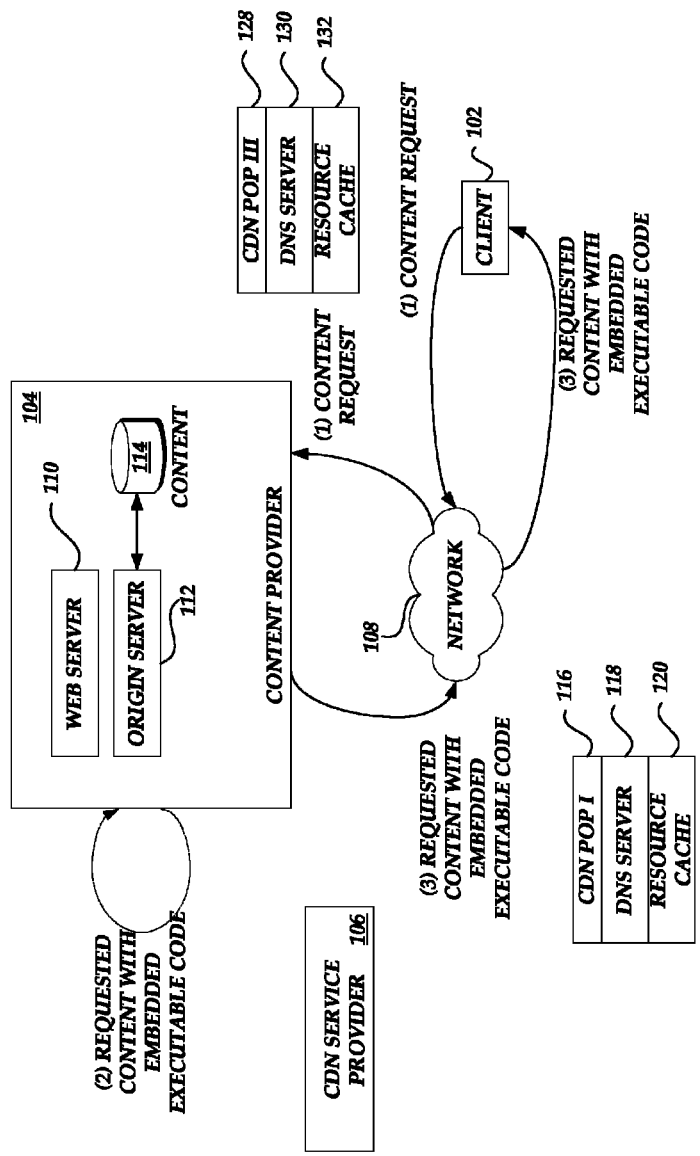
FIG. 3 is a block diagram of the content delivery environment of FIG. 1 illustrating the generation of resource requests by a client computing device.

With reference now to FIGS. 2-4, one embodiment related to the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for the optional registration of a content provider 104 with the CDN service provider 106 for hosting content on behalf of the content provider 104 will be described. As illustrated in FIG.

2, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104, or at least perform the processes described herein. Illustratively, the registration API can include the identification of the origin server 112 of the content provider 104 that may provide requested resources to the CDN service provider 106. In addition or alternatively, the registration API can include the content to be stored by the CDN service provider 106 on behalf of the content provider 104. Additionally, the content provider 104 can specify one or more network storage providers (not illustrated) that may act as an origin server for the content provider 104.

With continued reference to FIG. 2, upon receiving the registration API, the CDN service provider 106 obtains the registration information and generates, or otherwise obtains, embedded resource identifiers that will be utilized in the mapping of client identifiers. In an illustrative embodiment, and as will be explained in greater detail below, the embedded resource identifiers correspond to data or instructions that are processed by the client computing devices 102 to cause the client computing devices 102 to request specific resources from the CDN service provider 106. The resources may correspond to content, such as multi-media content, that is being hosted on behalf of the content provider 104. Additionally, in this illustrative embodiment, the CDN service provider 106 generates, or otherwise obtains, executable code that causes the client computing device to transmit resource requests to one or more computing devices associated with the CDN service provider 106. Unlike requests related to the embedded resource identifiers, the transmission of requests to the CDN service provider 106 based on the execution of the executable code may not result in the transmittal of actual content by the CDN service provider 106.

The CDN service provider 106 returns the resource identifiers and executable code to the content provider 104 along with any additional information. In turn, the content provider 104 can then store the embedded resource identifiers for embedding in requested content or otherwise embed (or associate) the embedded resource identifiers and executable code with requested content (such as Web page markup language). In an illustrative embodiment, the embedded resource identifiers can be applicable to multiple content providers 104. Alternatively, the embedded resource identifiers can be unique to each particular content provider 104. Still further, the CDN service provider 106 may provide additional logic to the content providers 104 that controls the circumstances or methodologies for processing the embedded resource identifiers and executable code provided in the requested content, such as executing the executable code. For example, the embedded resource identifiers can include instructions (or executable code) that define the type of content (e.g., specific Web pages) for which the embedded resource identifiers will apply.

With reference now to FIG. 3, after completion of the registration and embedding processes illustrated in FIG. 2, a client computing device 102 generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider identifies the appropriate responsive content. In an illustrative embodiment, the requested content can correspond to a Web page that is displayed on the client computing device 102 via the processing of information, such as hypertext markup language ("HTML"), extensible markup language ("XML"), and the like.

As previously described, the requested content can include a number of embedded resource identifiers that correspond to resource objects that should be obtained by the client computing device 102 as part of the processing of the requested content. The embedded resources can correspond to multi-media content, such as images, videos, text, etc. that will be processed by the client computing devices 102 and rendered on output devices. Additionally, the requested content will also include the additional executable code previously provided by the CDN service provider 106 (FIG. 2). In an illustrative embodiment, the embedded executable code previously provided by the CDN service provider 106 can be arranged in a manner such that it is processed prior to processing any other of the content in the requested content or processed in the earlier stages of the processing of the requested content, as allowed. Alternatively, the embedded executable code previously provided by the CDN service provider 106 can also be arranged such that it is processed after all any other embedded resources are processed so as to mitigate any type of interference or delay in the processing of other embedded resources/identifiers. Examples of executable code that can be included in the content requests include scripts executable by a browser software application, stand-alone executable software code, intermediate software code requiring additional processing, and the like.

Generally, the identification of the embedded resources provided by the content provider 104 will be in the form of resource identifiers that can be processed by the client computing device 102, such as through a browser software application. In an illustrative embodiment, the resource identifiers can be in the form of a uniform resource locator ("URL"). For purposes of an illustrative example, the URL can identify a domain of the content provider 104 (e.g., contentprovider.com) or CDN service provider 106 (e.g., CDNserviceprovider), a name of the resource to be requested (e.g., "resource.xxx") and a path where the resource will be found (e.g., "path"). By way of an illustrative example, the URLs of the embedded resource have the form of:

http://www.contentprovider.com/path/resource.xxx or http://www.CDNserviceprovider.com/path/resource.xxx Additionally, in an illustrative embodiment, any additional embedded resource identifiers previously provided by the CDN service provider 106 during the registration process (FIG. 2) will also be in the form of a resource identifier (e.g., URL) that can be processed by the client computing device 102, such as through a browser software application. For purposes of an illustrative example, the URL can identify a domain of the CDN service provider 106 (e.g., CDNserviceprovider.com), a name of a resource to be requested (e.g., "resource.xxx") and a path where the resource will be found (e.g., "path"). As will be explained in greater detail, the additional embedded resource identifiers previously provided by the CDN service provider 106 will identify a special resource such that a request for the special resource may not result in the delivery of an actual resource to the requesting client computing device 102. Accordingly, additional embedded resource identifiers can correspond to a different or the same domain as the other embedded resource identifiers included in the content request. In this illustrative example, the URLs of the additional embedded resource identifiers can have the form of:

http://www.CDNserviceprovider.com/path/resource.xxx

Figure 4A:
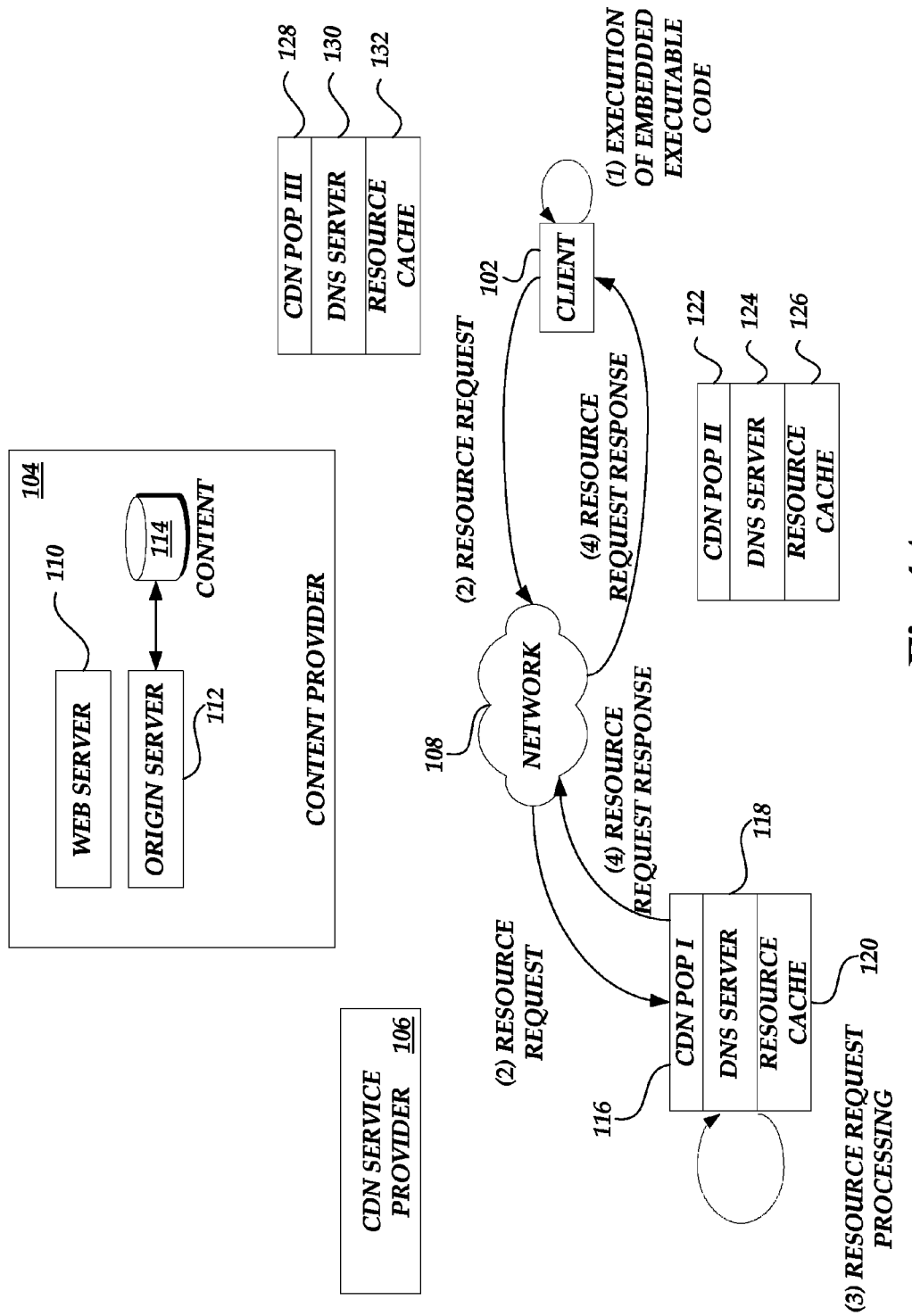
FIGS. 4A-4C are block diagrams of the content delivery environment of FIG. 1 illustrating the generation of multiple embedded resource requests by a client computing device based on the execution of executable code.

With reference now to FIG. 4A, upon receipt of the requested content, including the embedded resource identifiers and the executable code previously provided by the CDN service provider 106, the client computing device 102 processes the received information in a manner that causes the client computing device 102 to request the embedded resource previously provided by the CDN service provider 106 from the CDN service provider 106. In accordance with an embodiment utilizing the hypertext transfer protocol ("HTTP"), the request of a resource can correspond to a GET request transmitted by the client computing device 102 to an IP address associated with CDN service provider 106. Although not illustrated in FIG. 4A, the client computing device 102 would first issue a DNS query for the embedded resource previously provided by the CDN service provider 106, which if properly resolved, would include the identification of the above mentioned IP address associated with the CDN service provider 106. One skilled in the relevant art will appreciate that the resolution of the DNS query may involve multiple DNS queries to either the content provider 104 or CDN service provider 106.

With continued reference to FIG. 4A, the client computing device 102 also processes the executable code, such as a script, that causes the client computing device to generate one or more resource requests, or other types of data exchange between the CDN service provider 106 and the client computing device 102. In one embodiment, the request of a resource can also correspond to a GET request transmitted by the client computing device 102 to an IP address associated with CDN service provider 106. However, the resulting resource request generated by the client computing device 102 does not have to result in the transmission of a resource from the CDN service provider 106. Upon receipt of the resource request, the receiving POP, POP 116, processes the request and returns a response. Illustratively, the processing of the resource request can include the collection or logging of information associated with the resource request that will allow the CDN service provider 106 to determine performance metric information. The processing of the resource request can also include the generation of identifiers or other information that is returned to the client computing device 102 and that can be collected by the client computing device for purposes of determining performance metric information.

Figure 4B:
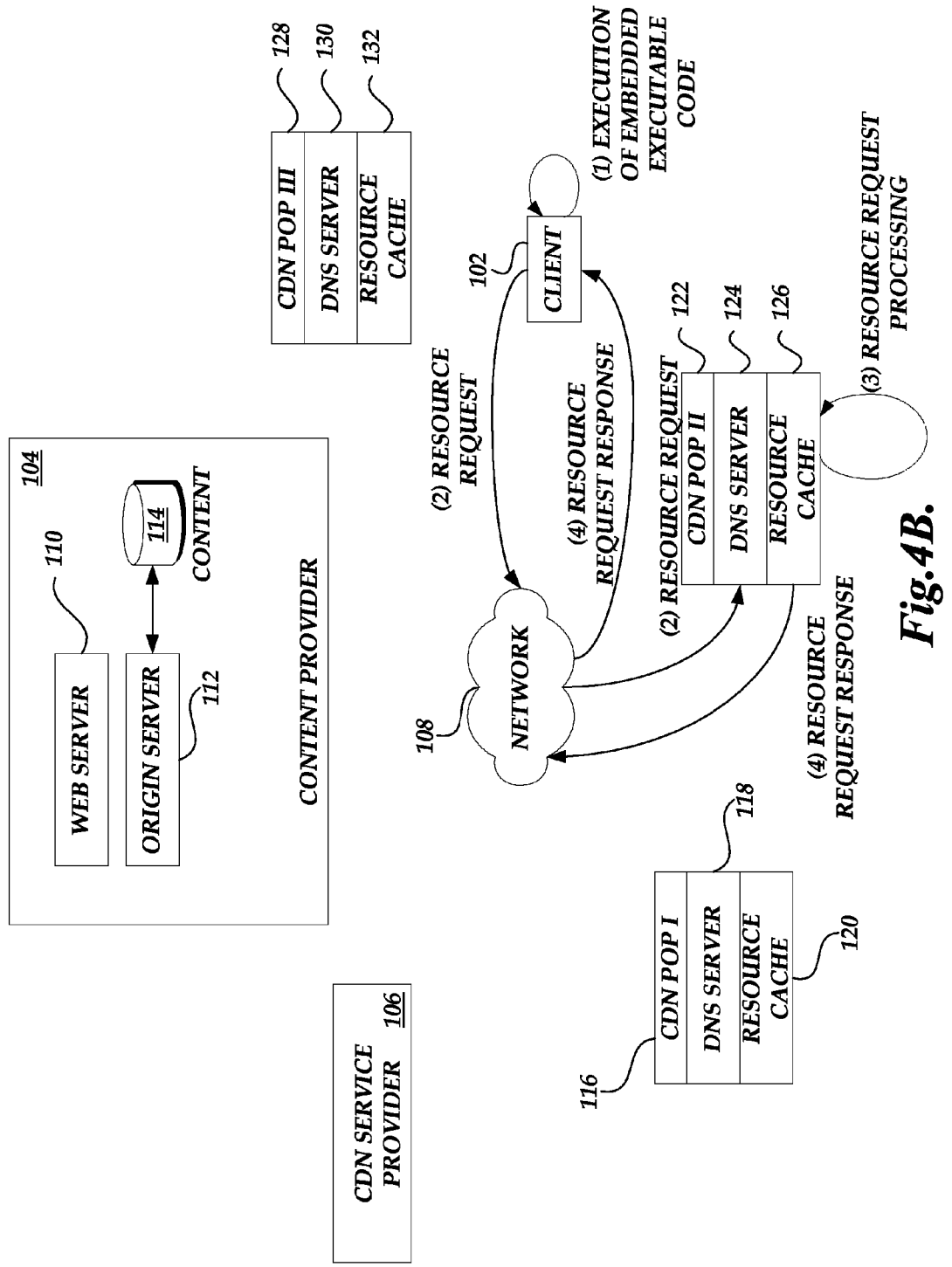

In an illustrative embodiment, based on the execution of the executable code, the client computing device 102 may transmit multiple resource requests for purposes of determining latency information. For example, a client computing device 102 may transmit two resource requests to different POPs to determine latency information associated with each POP. In another example, a client computing device 102 may transmit multiple resource requests to the same POP to verify latency information, conduct a series of latency tests for a single POP, test different software applications on the client computing device 102 or CDN service provider 106, test various Internet Service Provider ("ISP") functionality, and the like. With reference now to FIG. 4B, the client computing device 102 processes the executable code included in the returned content, such as a script, that causes the client computing device to generate additional resource requests, or other types of data exchange between the CDN service provider 106 and the client computing device. As described above, in one embodiment, the request of a resource can also correspond to a GET request transmitted by the client computing device 102 to an IP address associated with CDN service provider 106. However, the resulting resource request generated by the client computing device 102 may not necessarily correspond to any content that is to be generated by the client computing device and does not have to result in the transmission of resource from the CDN service provider 106. Upon receipt of the resource request, the receiving POP, POP 122, processes the request and, optionally, returns a response. Illustratively, the processing of the resource request can include the collection or logging of information associated with the resource request that will allow the CDN service provider 106 to determine performance metric information. The processing of the resource request can also include the generation of identifiers or other information that is returned to the client computing device 102 and that can be collected by the client computing device for purposes of determining performance metric information.

Figure 4C:
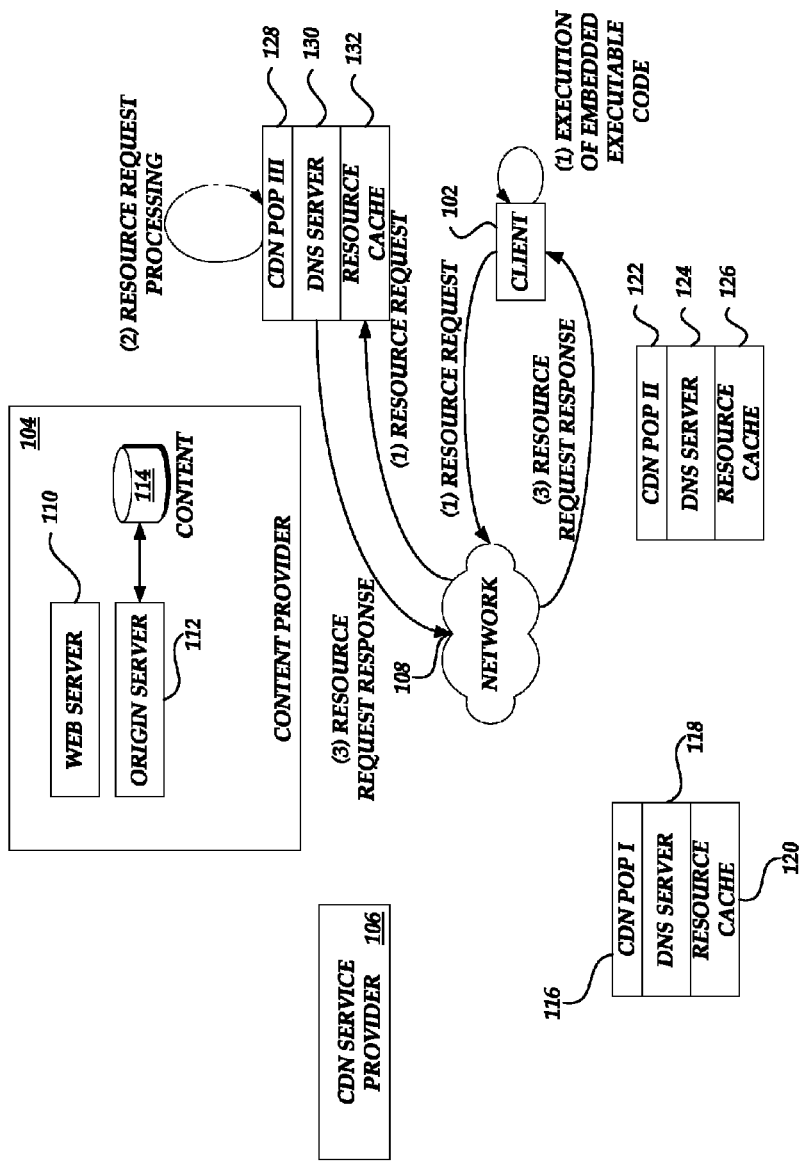

Finally, with reference now to FIG. 4C, with continued reference to an embodiment in which the executable code results in multiple resource requests to various POPs, the client computing device 102 processes the executable code, such as a script, that causes the client computing device to generate additional resource requests, or other types of data exchange between the CDN service provider 106 and the client computing device. As described above, in one embodiment, the request of a resource can also correspond to a GET request transmitted by the client computing device 102 to an IP address associated with CDN service provider 106. Similar to the description in FIG. 4B, the resulting resource request generated by the client computing device 102 may not necessarily correspond to any content that is to be generated by the client computing device and does not have to result in the transmission of a resource from the CDN service provider 106. Upon receipt of the resource request, the receiving POP, POP 128, processes the request and returns a response. Illustratively, the processing of the resource request can include the collection or logging of information associated with the resource request that will allow the CDN service provider 106 to determine performance metric information. The processing of the resource request can also include the generation of identifiers or other information that is returned to the client computing device 102 and that can be collected by the client computing device for purposes of determining performance metric information.

Figure 5:
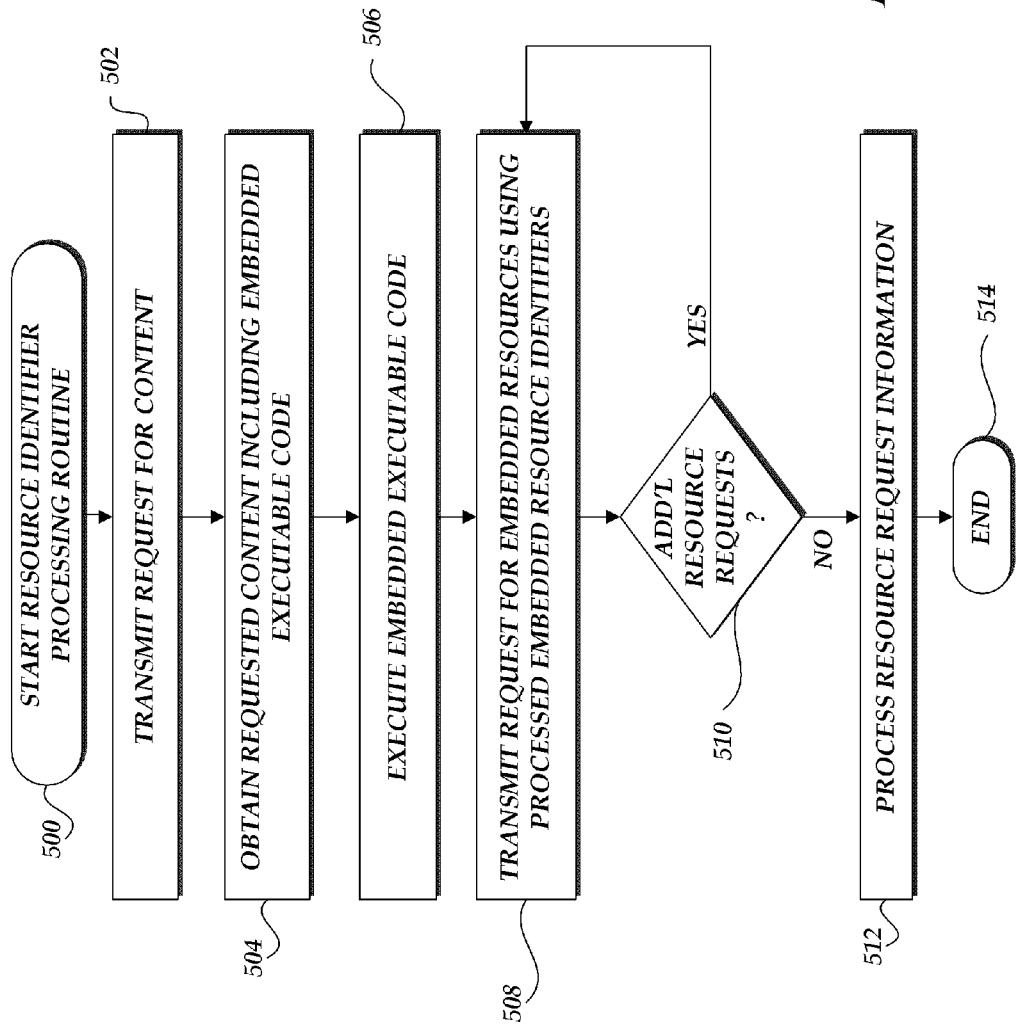
FIG. 5 is a flow diagram illustrative of a resource identifier processing routine implemented by a client computing device.

Turning now to FIG. 5, a routine 500 implemented by a client computing device 102 for the generation of resource requests based on the execution of executable code will be described. At block 502, the client computing device 102 transmits the original request for content. As described above, the request for content may directed to a Web server 110 of the content provider 104. At block 504, the client computing device 102 obtains responsive content that includes the embedded executable code provided by the CDN service provider 106 to the content provider 104. As described above, in an illustrative embodiment, the embedded executable code can correspond to script-based instructions that can be processed by a software application running on the client computing device 102. Still further, the translation request code can be organized in the responsive content such that the translation request is the first data processed by the client computing device 102 in accordance with the limitations/capabilities of the networking protocols and markup language.

At block 506, the client computing device 102 executes the embedded executable code and, at block 508, transmits a first request for embedded resources to the CDN service provider 106. As previously described, the executable code may be configured such that the resource request transmitted by the client computing device 102 is directed to a specific CDN service provider 106 component. At decision block 510, a test is conducted to determine whether the execution of the executable code results in additional resource requests. If so, the routine 500 returns to block 508 for the generation of one or more additional resource requests. The client computing device 102 can collect and store information associated with the transmission of each resource request and receipt of any response. Additionally, the client computing device 102 can process any returned information that facilitates a determination of performance metric information. For example, the returned information may include timing information, such as a time stamp, that can be utilized to determine network latency between the transmission and receipt of a response from the CDN service provider 106. As previously described, the additional resource requests may be configured such that they are to be received by the POP receiving the first resource request (e.g., a repeat resource request) or by a different POP within the CDN provider's domain.

Returning to decision block 510, once all the resource requests have been transmitted, at block 512, the client computing device 102 can process all collected resource request information to assist in the determination of latencies in the receipt of resources from the various components of the CDN service provider 106. In other embodiments, the processing of resource request information may correspond to the transmission of any collected information to the CDN service provider 106. Illustratively, the executable code provided in the returned content can include logic and functions necessary to process the resource request information and provide it to the CDN service provider 106. Alternatively, the client computing device 102 can include additional executable code or modules, software applications, etc. that facilitate the processing and reporting of the resource request information and provide it to the CDN service provider 106. Additionally, in embodiments in which the CDN service provider 106 obtains all the relevant information upon receipt of the resource request (e.g., embedded timing information it the request), block 512 may be omitted. At block 514, the routine 500 terminates.

Figure 6:
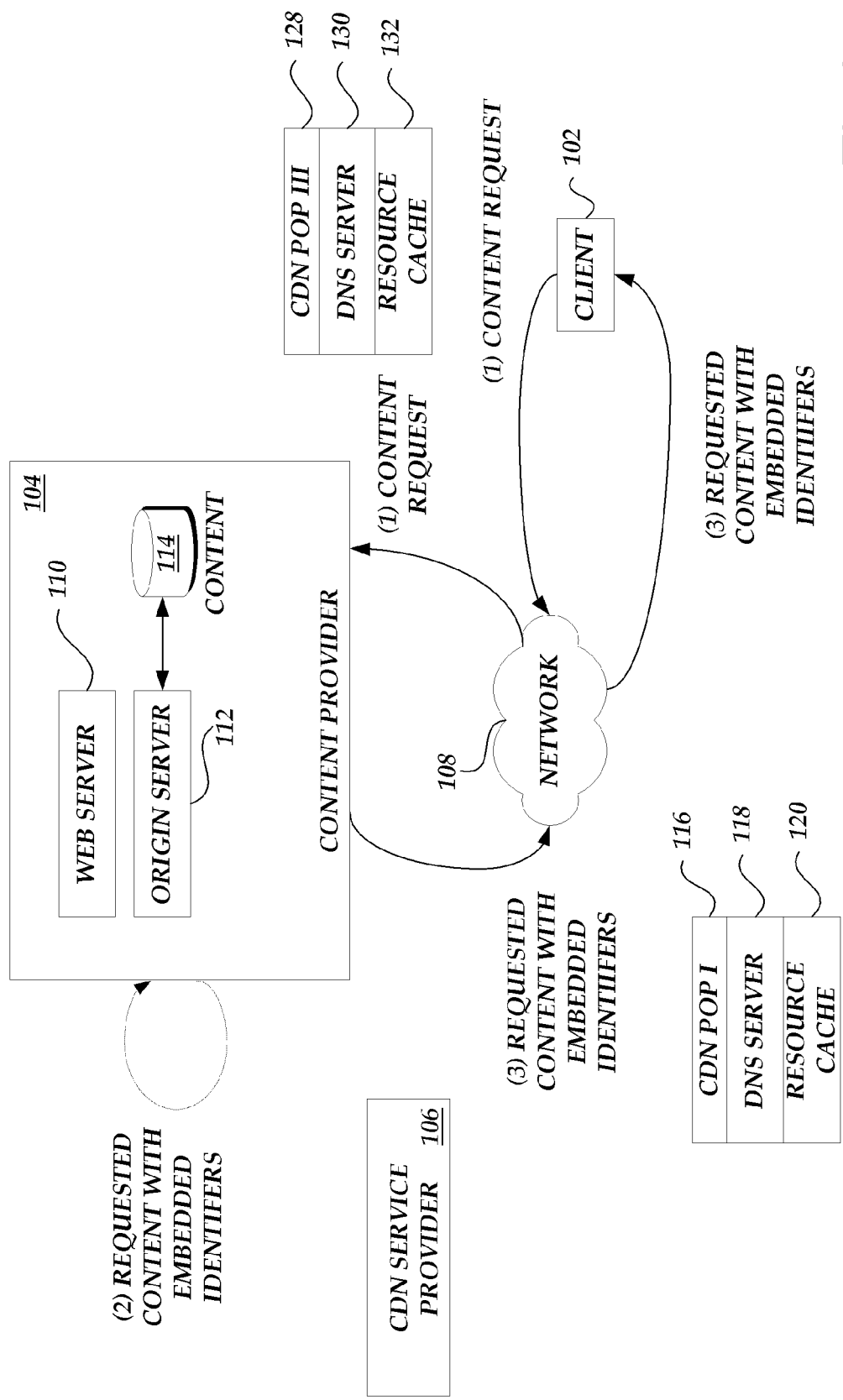
FIG. 6 is a block diagram of the content delivery environment of FIG. 1 illustrating the registration of a content provider with a CDN service provider.
Figure 7:
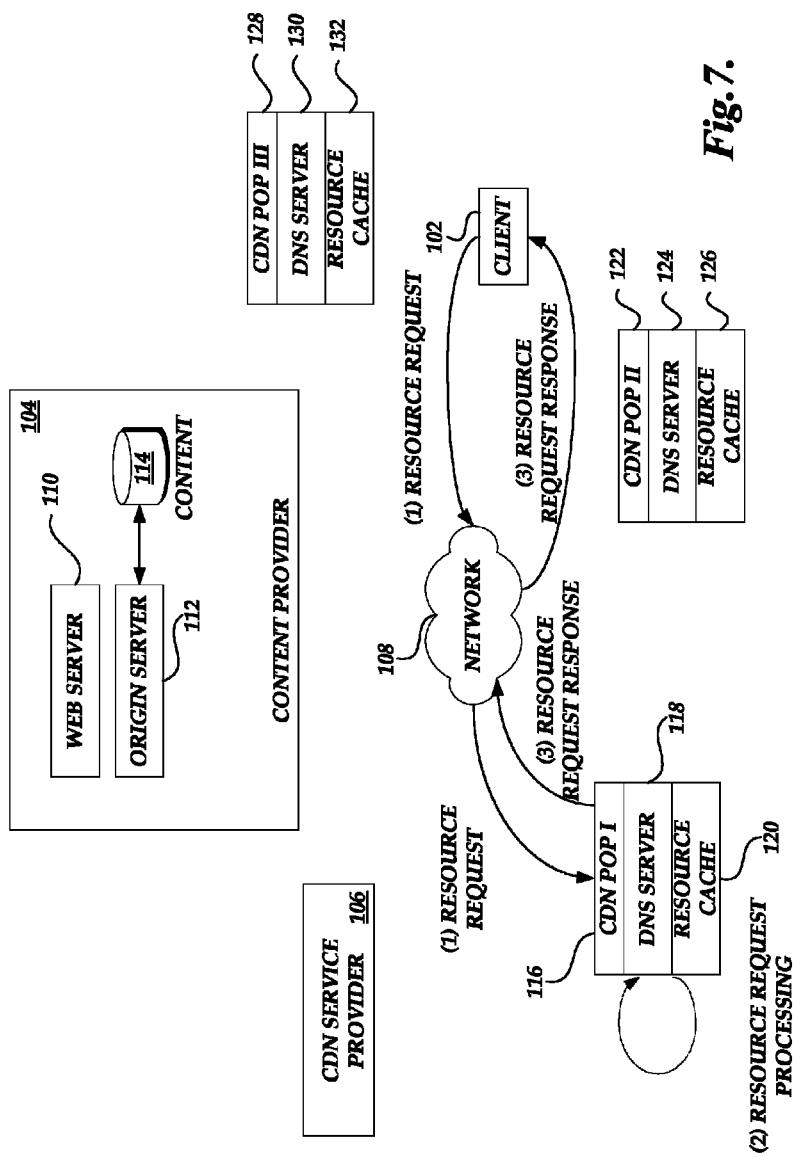
FIG. 7 is a block diagram of the content delivery environment of FIG. 1 illustrating the generation of resource requests by a client computing device.
Figure 8:
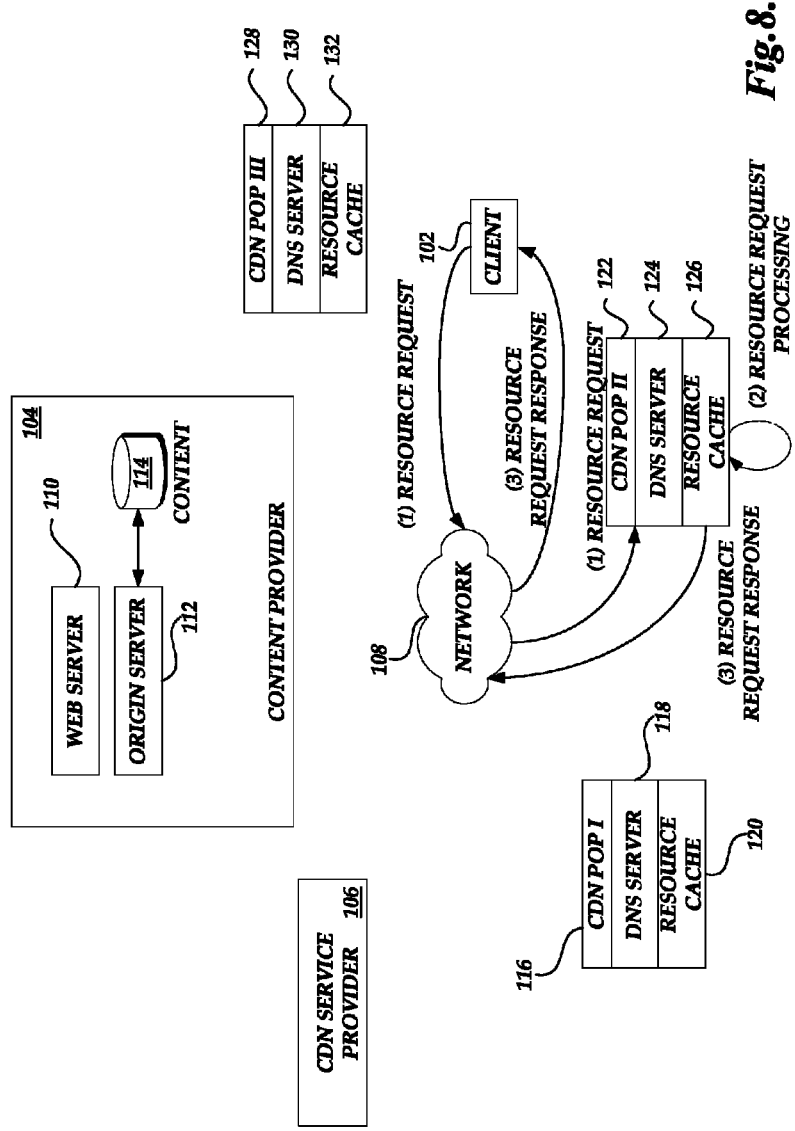
FIG. 8 is a block diagram of the content delivery environment of FIG. 1 illustrating the generation of resource requests by a client computing device responsive to a redirection command provided by a CDN service provider.

With reference now to FIGS. 6-8, another embodiment related to the interaction between various components of the content delivery environment 100 of FIG. 1 will be illustrated. For purposes of this illustrative example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference now to FIG. 6, after completion of the registration and embedding processes illustrated in FIG. 2, a client computing device 102 generates a content request that is received and processed by the content provider 104, such as through the Web server 110. In accordance with an illustrative embodiment, the request for content can be in accordance with common network protocols, such as HTTP. Upon receipt of the content request, the content provider identifies the appropriate responsive content. As described above, in an illustrative embodiment, the requested content can correspond to a Web page that is displayed on the client computing device 102 via the processing of information, such as HTML, XML, and the like. The requested content can include a number of embedded resource identifiers that correspond to resource objects that should be obtained by the client computing device 102 as part of the processing of the requested content. The embedded resources can correspond to multi-media content, such as images, videos, text, etc. that will be processed by the client computing devices 102 and rendered on output devices.

As described above, the identification of the embedded resources provided by the content provider 104 will be in the form of resource identifiers that can be processed by the client computing device 102, such as through a browser software application. In an illustrative embodiment, the resource identifiers can be in the form of a URL. For purposes of an illustrative example, the URL can identify a domain of the content provider 104 (e.g., contentprovider.com) or CDN service provider 106 (e.g., CDNserviceprovider), a name of the resource to be requested (e.g., "resource.xxx") and a path where the resource will be found (e.g., "path"). By way of an illustrative example, the URLs of the embedded resource have the form of:

http://www.contentprovider.com/path/resource.xxx or http://www.CDNserviceprovider.com/path/resource.xxx Additionally, in an illustrative embodiment, the additional embedded resource identifiers previously provided by the CDN service provider 106 during the registration process (FIG. 2) will also be in the form of a resource identifier (e.g., URL) that can be processed by the client computing device 102, such as through a browser software application. For purposes of an illustrative example, the URL can identify a domain of the CDN service provider 106 (e.g., CDNserviceprovider.com), a name of a resource to be requested (e.g., "resource.xxx") and a path where the resource will be found (e.g., "path"). As will be explained in greater detail, the embedded resource previously provided by the CDN service provider 106 will identify a special resource such that a request for the special resource may not result in the delivery of an actual resource to the requesting client computing device 102. As previously discussed, the additional embedded resource identifiers can correspond to a different or the same domain as the other embedded resource identifiers included in the content request. In this illustrative example, the URLs of the embedded resource have the form of:

http://www.CDNserviceprovider.com/path/resource.xxx

With reference now to FIG. 7, upon receipt of the requested content, including the embedded resource identifiers and the executable code previously provided by the CDN service provider 106, the client computing device 102 processes the received information in a manner that causes the client computing device 102 to request the embedded resource previously provided by the CDN service provider 106 from the CDN service provider 106. In accordance with an embodiment utilizing HTTP, the request of a resource can correspond to a GET request transmitted by the client computing device 102 to an IP address associated with CDN service provider 106. Although not illustrated in FIG. 7, the client computing device 102 would first issue a DNS query for the embedded resource previously provided by the CDN service provider 106, which if properly resolved, would include the identification of the above-mentioned IP address associated with the CDN service provider 106. One skilled in the relevant art will appreciate that the resolution of the DNS query may involve multiple DNS queries to either the content provider 104 or CDN service provider 106.

As also illustrated in FIG. 7, a receiving POP, POP 116, obtains the resource request and processes the request. Illustratively, the processing of the resource request can include the collection or logging of information associated with the resource request that will allow the CDN service provider 106 to determine performance metric information. Additionally, in this embodiment, the processing of the resource request also includes the generation of at least one additional resource identifier and corresponding commands that will cause the client computing device 102 to issue one or more subsequent requests for resources. In accordance with an embodiment utilizing HTTP, the response can include a resource identifier in accordance with a REDIRECT command that causes the client computing device 102 to generate a subsequent resource request.

With reference now to FIG. 8, in an illustrative embodiment, upon receipt of the response (e.g., the at least one additional resource identifier and corresponding commands) from the CDN service provider 106, the client computing device 102 issues a subsequent resource request corresponding to the at least one additional resource identifier. In one embodiment, the additional resource identifier is configured such that the subsequent request is received at a different POP, POP 122. In another embodiment, the additional resource identifier can be configured such that the subsequent request is received at the same POP. Based on a series of commands, the client computing device 102 or CDN service provider 106 can collect performance metric information that facilitates the determination of latency information (or other information) associated with the transmission of resource requests.

Figure 9:
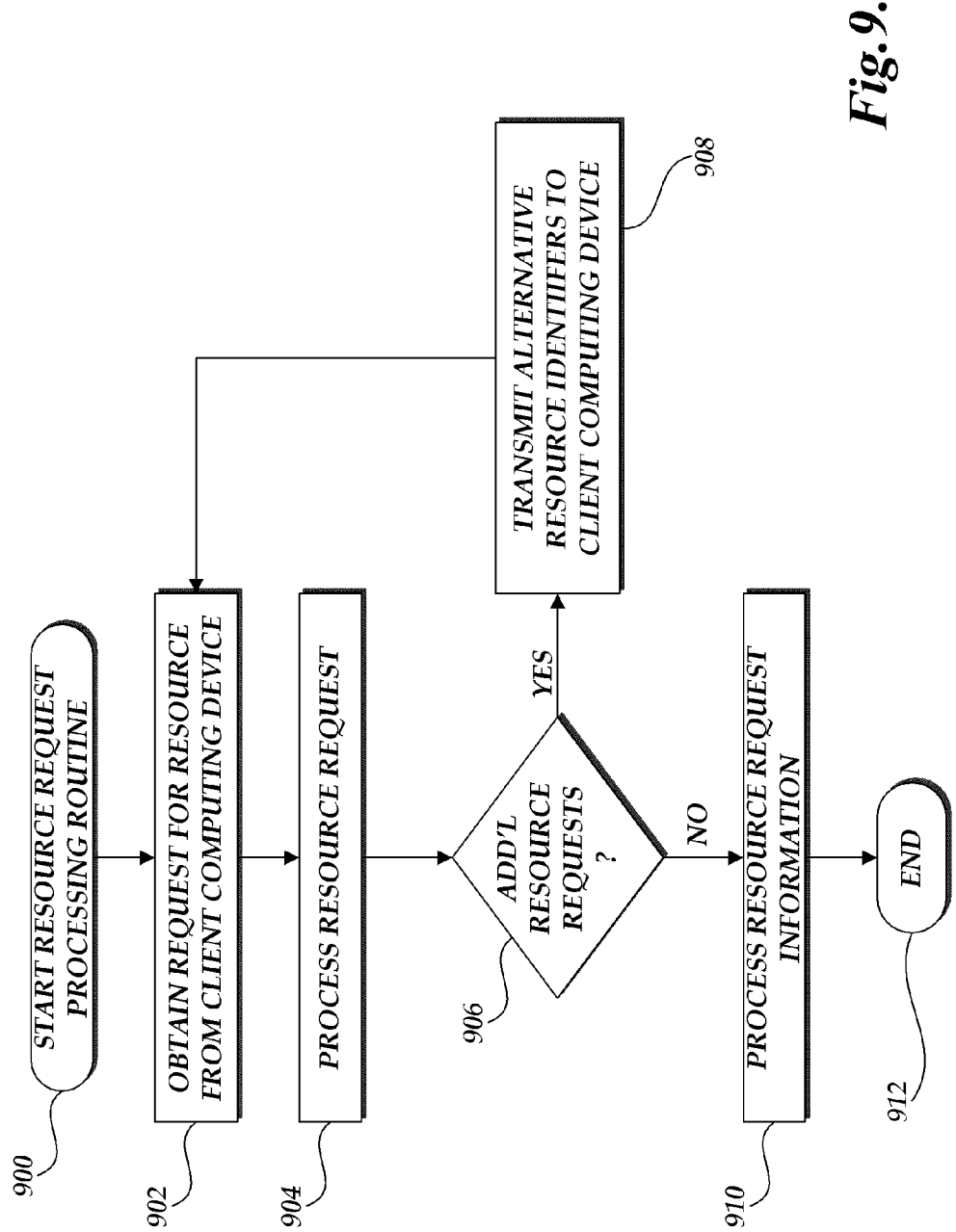
FIG. 9 is a flow diagram illustrative of a resource request processing routine implemented by a CDN service provider.

Turning now to FIG. 9, a routine 900 implemented by a CDN service provider 106 for the processing of resource requests will be described. One skilled in the relevant art will appreciate that actions/steps outlined for routine 900 may be implemented by one or many computing devices/components that are associated with the CDN service provider 106. Accordingly, routine 900 has been logically associated as being generally performed by the CDN service provider 106, and thus the following illustrative embodiments should not be construed as limiting.

At block 902, the CDN service provider 106 obtains the original request for content. As described above, the client computing device 102 transmits the request for content based on one or more embedded resource identifiers. At block 904, the CDN service provider 106 processes the resource request. In an illustrative embodiment, the CDN service provider 106 can utilize a variety of logic in determining how to process resource requests. For example, if the resource request corresponds to an actual resource to be delivered by the CDN service provider 106, the CDN service provider 106 can utilize various criteria to determine which resource requests will result in the delivery of the resource and which resource requests will result in the return of a REDIRECT command. In another example, the CDN service provider 106 can maintain some type of count or other selection mechanism to determine how many REDIRECT commands to provide. In still another example, the CDN service provider 106 can provide REDIRECT commands for all requests for particular resources or all requests from particular types of requesting client computing devices 102 (e.g., all client computing devices associated with a particular ISP). Additionally, the CDN service provider 106 can collect and store information associated with the transmission of each resource request and receipt of any response.

Once the resource request has been processed, at decision block 906, a test is conducted to determine whether there will be additional resource requests that will be processed. If so, the CDN service provider 106 transmits the alternative resource identifier and corresponding REDIRECT command (or similar command) and the routine 900 returns to block 902 to repeat the process for the alternative resource identifier. Accordingly, the routine 900 can be repeated a number of times for a set of successive resource requests and performance metric measures.

Returning to decision block 906, once all the resource requests have been received, at block 910, the CDN service provider 106 can process all collected resource request information to assist in the determination of latencies in the receipt of resources from the various components of the CDN service provider 106. In other embodiments, the processing of resource request information may correspond to the receipt of any collected information and processing information provided by the client computing device 102. At block 912, the routine 900 ends.

Figure 10:
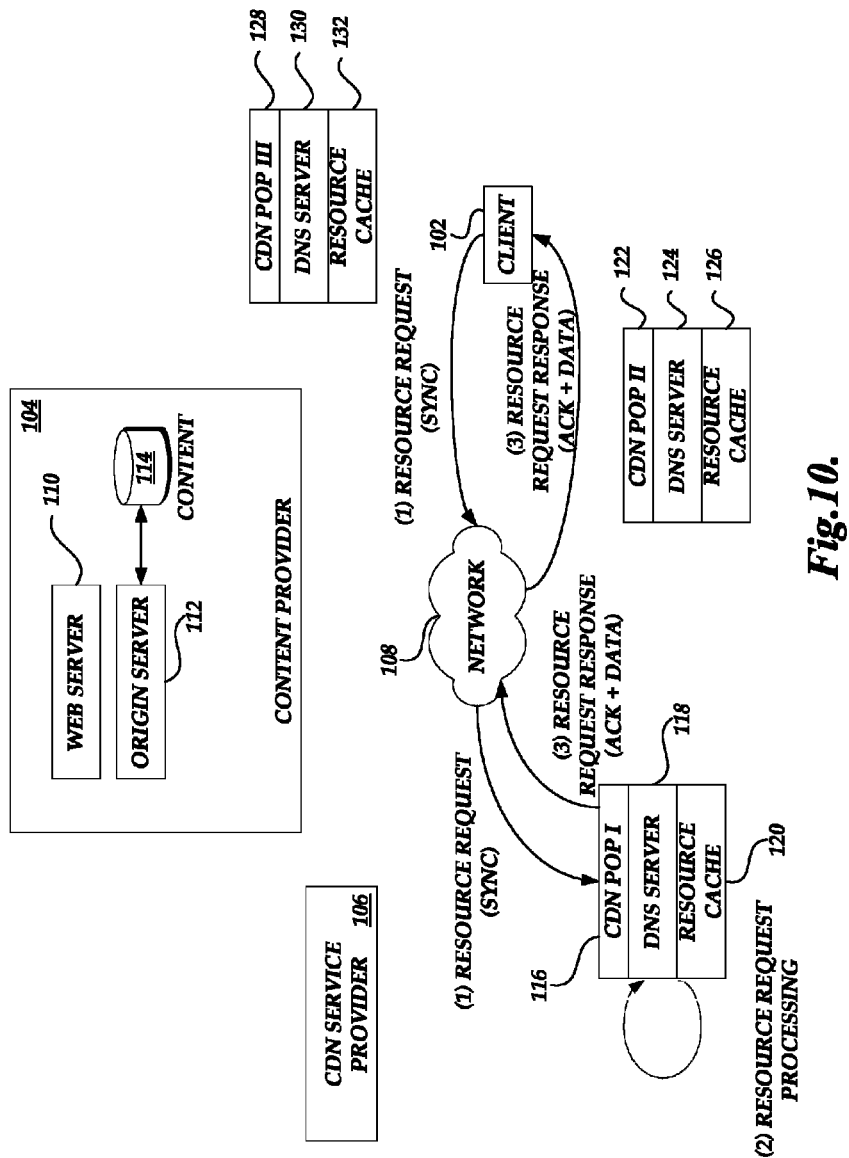
FIG. 10 is a block diagram of the content delivery environment of FIG. 1 illustrating the generation of resource requests by a client computing device.
Figure 11:
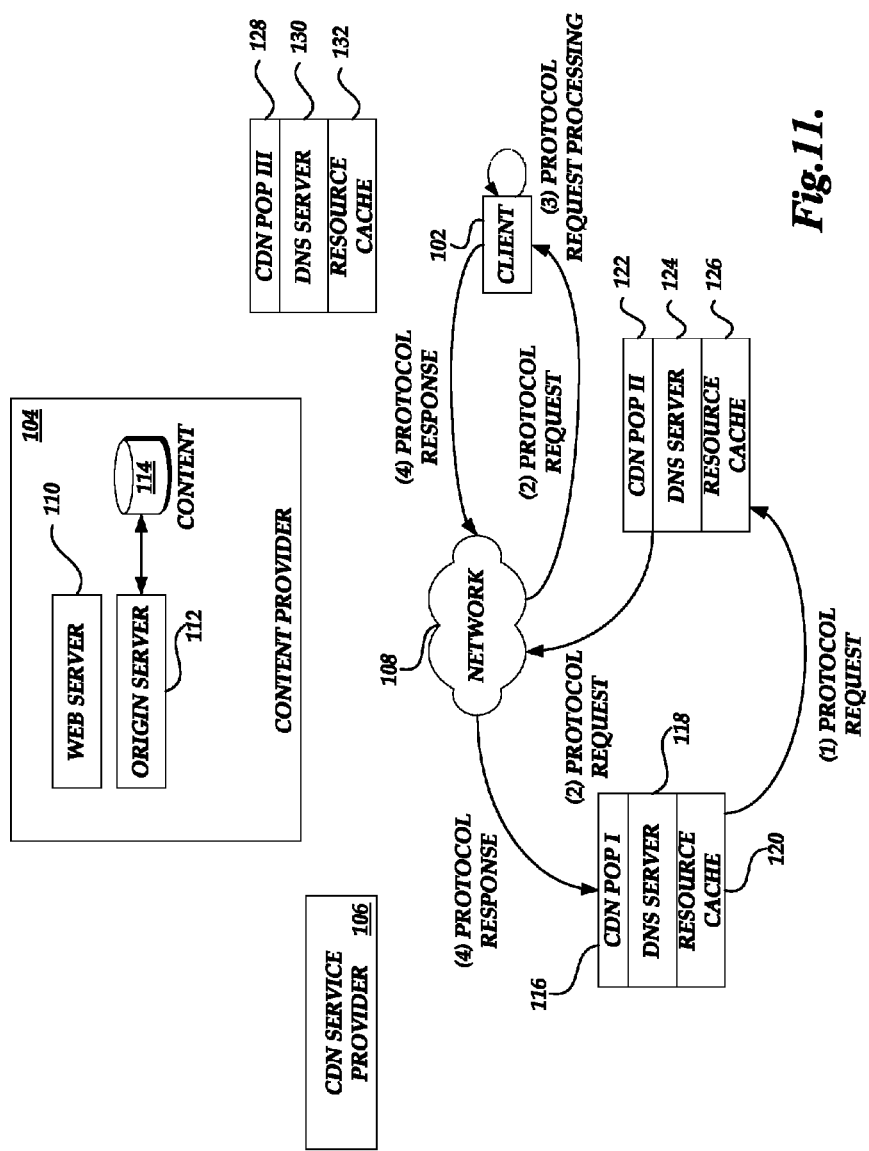
FIG. 11 is a block diagram of the content delivery environment of FIG. 1 illustrating the protocol interaction between a client computing device and multiple Point of Presence associated with a CDN service provider.

With reference now to FIGS. 10 and 11, another embodiment related to the interaction between various components of the content delivery environment 100 of FIG. 1 will be illustrated. For purposes of this illustrative example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference now to FIG. 10, after completion of the registration and embedding processes illustrated in FIG. 2, a client computing device 102 generates a content request that is received and processed by the content provider 104, such as through the Web server 110. In accordance with an illustrative embodiment, the request for content can be in accordance with common network protocols, such as HTTP. Upon receipt of the content request, the content provider identifies the appropriate responsive content. As described above, in an illustrative embodiment, the requested content can correspond to a Web page that is displayed on the client computing device 102 via the processing of information, such as HTML, XML, and the like. The requested content can include a number of embedded resource identifiers that correspond to resource objects that should be obtained by the client computing device 102 as part of the processing of the requested content. The embedded resources can correspond to multimedia content, such as images, videos, text, etc. that will be processed by the client computing devices 102 and rendered on output devices.

Although not previously discussed, in an illustrative embodiment, the client computing device 102 and the receiving POP, illustratively POP 116, may engage in a number of communication exchanges corresponding to the communication and networking protocols utilized to exchange information and request/receive the resource. For example, with regard to an HTTP-based request, the client computing device 102 may first transmit a synchronization command (e.g., a SYNC command) that elicits an acknowledgement from the receiving POP. At that point, the client computing device 102 and POP can establish a communication channel and process the resource request in a manner described above.

As also illustrated in FIG. 10, a receiving POP, POP 116, obtains the resource request and processes the request. Illustratively, the processing of the resource request can include the collection or logging of information associated with the resource request that will allow the CDN service provider 106 to determine performance metric information.

With reference now to FIG. 11, upon the transmission of the response to the CDN service provider 106, the communication channel is typically closed or terminated by the transmission of a termination command, such as a FIN command in HTTP. In this embodiment, the receiving POP does not transmit the termination command. Rather, the POP 116 transmits a request to another CDN service provider 106 POP, such as POP 122, to transmit one or more commands. The POP 122 obtains the request and transmits the protocol commands to the client computing device 102. As illustrated in FIG. 11, the client computing device 102 may transmit additional protocol commands, such as an acknowledgement to the original POP, POP 116, and can include performance metric information related to the latencies associated with the transmission of protocol commands from the other POP. In an illustrative embodiment, client computing device 102 may not be aware that any of the subsequent transmissions originated from another POP. One skilled in the relevant art will appreciate that while this embodiment is illustrated with regard to specific HTTP commands, the present disclosure is not limited to any particular networking or communication protocol or specific commands or type of commands within a networking or communication protocol.

Figure 12:
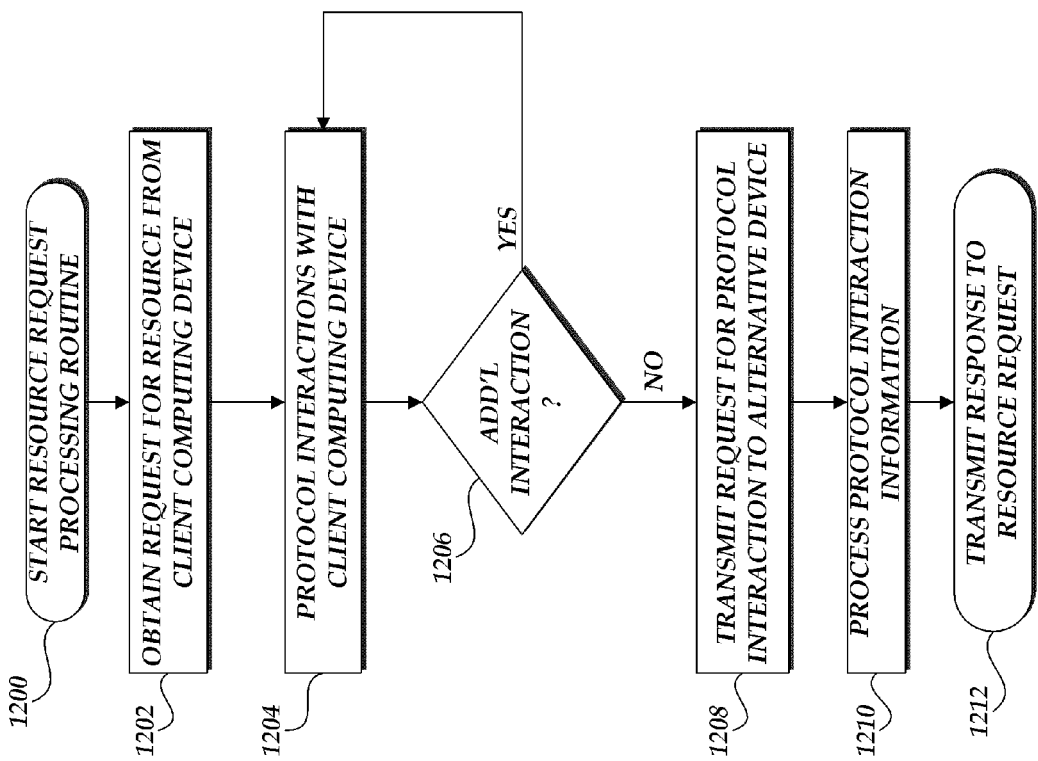
FIG. 12 is a flow diagram illustrative of a resource request processing routine implemented by a CDN service provider.

Turning now to FIG. 12, a routine 1200 implemented by a CDN service provider 106 for the processing of resource requests will be described. One skilled in the relevant art will appreciate that actions/steps outlined for routine 1200 may be implemented by one or many computing devices/components that are associated with the CDN service provider 106. Accordingly, routine 1200 has been logically associated as being generally performed by the CDN service provider 106, and thus the following illustrative embodiments should not be construed as limiting At block 1202, the CDN service provider 106 obtains the original request for content. As described above, the client computing device 102 transmits the request for content based on one or more embedded resource identifiers. At block 1204, the CDN service provider 106 initiates protocol-based interactions related to the establishment of a communication channel and request for resources. Examples of protocol interactions can include various synchronization commands, acknowledgments and the identification of the requests. Additionally, the CDN service provider 106 can collect and store information associated with the transmission of each resource request and receipt of any response.

Once the resource request has been processed, at decision block 1206, a test is conducted to determine whether there will be additional interaction between the POP and the client computing device 102. If so, the routine 1200 returns to block 1204 for additional protocol interactions. Returning to decision block 1206, once no additional interaction is required or the CDN service provider 106 determines that it wants another component to interact with the client computing device 102, at block 1208, the CDN service provider 106 (through the POP) transmits a request to another POP (or other component) to transmit additional protocol communications with the client computing device 102.

At block 1210, the CDN service provider 106 can process all collected resource request information to assist in the determination of latencies in the receipt of resources from the various components of the CDN service provider 106. In other embodiments, the processing of resource request information may correspond to the receipt of any collected information and processing information provided by the client computing device 102. At block 1212, the routine 1200 ends.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface; further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for processing content comprising:

obtaining, by a service provider, a protocol-based request for a resource, the protocol-based request for a resource-corresponding to an embedded resource identifier, wherein the protocol-based request is generated by a client computing device responsive to obtaining originally requested content including the embedded resource identifier from the service provider;

transmitting, by the service provider, responsive protocol-based request information, wherein the responsive protocol-based request information is transmitted by a first separately identifiable component of the service provider to the client computing device;

transmitting, by the service provider, a request from the first separately identifiable component of the service provider to a second separately identifiable component of the service provider to initiate protocol-based communications with the client computing device;

transmitting, by the service provider, additional protocol-based request information, wherein the additional protocol-based request information is transmitted by the second separately identifiable component of the service provider to the client computing device responsive to the request from the first separately identifiable component of the service provider; and determining, by the service provider, latency information corresponding to the responsive protocol-based request information transmitted by the first separately identifiable component of the service provider and the additional protocol-based request information transmitted by the second separately identifiable component of the service provider, the latency information corresponding to a communication latency between the client computing device and the first and second separately identifiable components of the service provider for the respective transmissions.

2. The method as recited in claim 1, wherein the embedded resource identifier corresponds to a uniform resource locator of the service provider.

3. The method as recited in claim 1, wherein the protocol corresponds to a hypertext transfer protocol command.

4. The method as recited in claim 1, wherein the additional protocol-based request information transmitted by second separately identifiable component of the service provider includes a termination command.

5. The method as recited in claim 4 further comprising obtaining additional protocol based request information from the client computer at the first separately identifiable component of the service provider, the additional protocol based request information from the client computer responsive to the additional protocol-based request information transmitted by the second separately identifiable component of the service provider.

6. The method as recited in claim 1 further comprising obtaining, from the client computing device, latency information corresponding to the protocol-based request, the latency information corresponding to a communication latency between the client computing device and a separately identifiable component of the service provider.

7. A computer-implemented method for processing content comprising:

transmitting, by a client computing device, a protocol-based request for a resource, the protocol-based request for a resource corresponding to an embedded resource identifier, wherein the protocol-based request for the resource is received by a service provider responsive to the service provider providing originally requested content including the embedded resource identifier to the client computing device;

obtaining, by the client computing device, responsive protocol-based processing information, wherein the responsive protocol-based processing information is transmitted to the client computing device by a first identifiable component of the service provider;

obtaining, by the client computing device, responsive protocol-based processing information, wherein the responsive protocol-based processing information is transmitted to the client computing device by a second identifiable component of the service provider;

determining, by the client computing device, metric information corresponding to the received responsive protocol-based processing information from the first and second identifiable components of the service provider, the metric information corresponding to communications between the client computing device and the first and second separately identifiable components of the service provider for the received responsive protocol-based processing information; and transmitting the metric information to the service provider.

8. The method as recited in claim 7, wherein the embedded resource identifier corresponds to a uniform resource locator of the service provider.

9. The method as recited in claim 7, wherein the protocol corresponds to a hypertext transfer protocol command.

10. The method as recited in claim 7, wherein the metric information corresponds to latency information between the client computing device and the first and second identifiable components of the service provider.

11. A computer-implemented system for processing content, the system comprising:

a data store configured to store computer-executable instructions; and a hardware processor in communication with the data store, the hardware processor corresponding to a service provider and configured to execute the computer-executable instructions to at least:

obtain a protocol-based request for a resource at a first separately identifiable component of the service provider, the protocol-based request for a resource corresponding to an embedded resource identifier, wherein the protocol-based request for the resource is generated by a client computing device responsive to obtaining originally requested content including the embedded resource identifier from the service provider;

transmit responsive protocol-based request information, wherein the responsive protocol-based request information is transmitted by the first separately identifiable component of the service provider to the client computing device;

transmit a request from the first separately identifiable component of the service provider to a second separately identifiable component of the service provider to initiate protocol-based communications with the client computing device;

transmit additional protocol-based request information, wherein the additional protocol-based request information is transmitted by second separately identifiable component of the service provider to the client computing device responsive to the request from the first separately identifiable component of the service provider;

determine metric information corresponding to the responsive protocol-based request information transmitted by the first separately identifiable component of the service provider and the additional protocol-based request information transmitted by the second separately identifiable component of the service provider, the metric information corresponding to communications between the client computing device and the first and second separately identifiable components of the service provider for the responsive protocol-based request information; and update the performance metric information according to the determined metric information.

12. The system as recited in claim 11, wherein the hardware processor is further configured to execute the computer-executable instructions to at least obtain, from the client computing device, latency information associated with the responsive protocol-based request information transmitted by the first separately identifiable component of the service provider and the additional protocol-based request information transmitted by the second separately identifiable component of the service provider, the latency information corresponding to a communication latency between the client computing device and a separately identifiable component of the service provider.

13. The system as recited in claim 11, wherein the metric information corresponds to latency information between the client computing device and the first and second separately identifiable components of the service provider.

14. The system as recited in claim 11, wherein the protocol corresponds to a hypertext transfer protocol command.

15. The method as recited in claim 14, wherein the additional protocol-based request information transmitted by the second separately identifiable component of the service provider includes a termination command.

* * * * *

UNITED STATES PATENT AND TRADEMARK OFFICE
CERTIFICATE OF CORRECTION

PATENT NO. : 8,930,513 B1
APPLICATION NO. : 12/892861
DATED : January 6, 2015
INVENTOR(S) : David R. Richardson et al.

Page 1 of 1

It is certified that error appears in the above-identified patent and that said Letters Patent is hereby corrected as shown below:

On the title page, item 56

At Page 1, Col. 1, Line 30, under "Other Publications," please delete "[retrived" and insert --[retrieved--.

At Page 6, Col. 2, Line 14, under "Other Publications," please delete "15 pages." and insert --15 pages.--.

At Page 7, Col. 1, Line 65, under "Other Publications," please delete "Candian" and insert --Canadian--.

In the drawings

At Sheet 8 of 14 of the Drawings, Fig. 6, Line 4, below Reference Numeral 106, please delete "IDENTIIFERS" and insert --INDENTIFIERS--.

At Sheet 8 of 14 of the Drawings, Fig. 6, Line 4, below Reference Numeral 102, please delete "IDENTIIFERS" and insert --INDENTIFIERS--.

At Sheet 11 of 14 of the Drawings, Fig. 9, Line 2, Reference Numeral 908, please delete "IDENTIIFERS" and insert --INDENTIFIERS--.

In the specification

At Col. 1, Line 53, please delete "devices" and insert --devices,--.
At Col. 3, Line 7, please delete "latencies" and insert --latencies.--.
At Col. 11, Line 33, please delete "limiting" and insert --limiting.--.
At Col. 13, Line 25, please delete "limiting" and insert --limiting.--.

In the claims

At Col. 15, Line 25, in Claim 5, please delete "protocol based" and insert --protocol-based--.
At Col. 15, Line 27, in Claim 5, please delete "protocol based" and insert --protocol-based--.
At Col. 17, Line 10, in Claim 15, please delete "method" and insert --system--.

Signed and Sealed this
Twenty-second Day of December, 2015

Michelle K. Lee
*Director of the United States Patent and Trademark Office*